United States Patent
Thompson

(10) Patent No.: US 10,095,703 B2
(45) Date of Patent: *Oct. 9, 2018

(54) ANALYZING AND CORRECTING CORRUPTION WHICH CAUSED FILESYSTEM CHECKER FAILURE SO THAT THE FILESYSTEM CHECKER WILL RUN WITHOUT ERROR

(71) Applicant: International Business Machines Corporation, Armonk, NY (US)

(72) Inventor: Robert W. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 14/737,675

(22) Filed: Jun. 12, 2015

(65) Prior Publication Data
US 2016/0224439 A1 Aug. 4, 2016

Related U.S. Application Data

(63) Continuation of application No. 14/610,082, filed on Jan. 30, 2015.

(51) Int. Cl.
*G06F 17/00* (2006.01)
*G06F 17/30* (2006.01)
*G06F 11/14* (2006.01)

(52) U.S. Cl.
CPC .... *G06F 17/30144* (2013.01); *G06F 11/1471* (2013.01); *G06F 17/3012* (2013.01);
(Continued)

(58) Field of Classification Search
CPC .......... G06F 17/30371; G06F 11/1471; G06F 17/30144; G06F 17/30377; G06F 17/30156
(Continued)

(56) References Cited

U.S. PATENT DOCUMENTS 6,718,481 B1 * 4/2004 Fair ...................... G06F 11/0727
709/224
7,143,120 B2 * 11/2006 Oks ...................... G06F 11/1402
707/679
(Continued)

OTHER PUBLICATIONS

IBM, "List of IBM Patents or Patent Applications Treated as Related (Appendix P)," Jun. 12, 2015, p. 1-2.
(Continued)

*Primary Examiner* — Phong H Nguyen
(74) *Attorney, Agent, or Firm* — Patricia B. Feighan

(57) ABSTRACT

A method for repairing a corrupted filesystem, whereby the corrupted filesystem includes a plurality of corrupted metadata structures is provided. The method may include determining a plurality of missing metadata structures associated with the corrupted filesystem. The method may also include determining a plurality of current addresses corresponding to a plurality of valid metadata structures in a hierarchical metadata structure of the corrupted filesystem. The method may further include locating the plurality of missing metadata structures and a plurality of addresses associated with the missing metadata. The method may also include rebuilding the plurality of missing metadata structures based on the located plurality of addresses associated with the missing metadata structures, whereby the rebuilding comprises assigning the located plurality of address to the plurality of missing metadata structures and redirecting the plurality of missing metadata structures to point to a correct plurality of other metadata structures.

7 Claims, 12 Drawing Sheets

(52) U.S. Cl.
CPC .. *G06F 17/30082* (2013.01); *G06F 17/30156* (2013.01); *G06F 17/30371* (2013.01); *G06F 17/30377* (2013.01); *G06F 2201/80* (2013.01); *G06F 2201/82* (2013.01)

(58) Field of Classification Search
USPC .................................................. 707/690, 691
See application file for complete search history.

(56) References Cited

U.S. PATENT DOCUMENTS

| | | | |
|---|---|---|---|
| 7,523,343 B2 * | 4/2009 | Leis .................... | G06F 11/0727 714/5.11 |
| 8,140,570 B2 | 3/2012 | Ingrassia et al. | |
| 8,442,952 B1 * | 5/2013 | Armangau ........ | G06F 17/30159 706/14 |
| 8,612,382 B1 | 12/2013 | Patel et al. | |
| 2004/0153710 A1 * | 8/2004 | Fair ..................... | G06F 11/0727 714/4.1 |
| 2005/0246612 A1 * | 11/2005 | Leis .................... | G06F 11/0727 714/763 |

OTHER PUBLICATIONS

Thompson, "Analyzing and Correcting Corruption Which Caused Filesystem Checker Failure so That the Filesystem Checker Will Run Without Error," filed Jan. 30, 2015, p. 1-43, U.S. Appl. No. 14/610,082.
Mell et al., "The NIST Definition of Cloud Computing," National Institute of Standards and Technology, Information Technology Laboratory, Oct. 7, 2009, Version 15.

* cited by examiner

ANALYZING AND CORRECTING CORRUPTION WHICH CAUSED FILESYSTEM CHECKER FAILURE SO THAT THE FILESYSTEM CHECKER WILL RUN WITHOUT ERROR

BACKGROUND

The present invention relates generally to the field of computers, and more particularly to filesystem checker failure.

Most filesystems have a filesystem checker, such as a "file system consistency check" fsck) which is used to ensure that the metadata of the filesystem is consistent. Such a filesystem checker is typically used after a system crash to ensure the filesystem is consistent before being mounted. The filesystem checker may also be used whenever a filesystem has been corrupted to attempt to fix any metadata inconsistencies and recover any lost files caused by corruption.

SUMMARY

According to one embodiment, a method for repairing a corrupted filesystem, whereby the corrupted filesystem includes a plurality of corrupted metadata structures is provided. The method may include determining a plurality of missing metadata structures associated with the corrupted filesystem, whereby the missing metadata structures have been overwritten by a corruption. The method may also include determining a plurality of current addresses corresponding to a plurality of valid metadata structures in a hierarchical metadata structure of the corrupted filesystem based on the determined plurality of missing metadata structures, whereby at least one metadata structure within the plurality of metadata structures serves as a node pointing to a plurality of other metadata structures. The method may further include locating the plurality of missing metadata structures and a plurality of addresses associated with the missing metadata structures based on the determined plurality of current addresses corresponding to a plurality of valid metadata structures. The method may also include rebuilding the plurality of missing metadata structures based on the located plurality of addresses associated with the missing metadata structures, whereby the rebuilding comprises assigning the located plurality of address to the plurality of missing metadata structures and redirecting the plurality of missing metadata structures to point to a correct plurality of other metadata structures.

According to another embodiment, a computer system for repairing a corrupted filesystem, whereby the corrupted filesystem includes a plurality of corrupted metadata structures is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining a plurality of missing metadata structures associated with the corrupted filesystem, whereby the missing metadata structures have been overwritten by a corruption. The method may also include determining a plurality of current addresses corresponding to a plurality of valid metadata structures in a hierarchical metadata structure of the corrupted filesystem based on the determined plurality of missing metadata structures, whereby at least one metadata structure within the plurality of metadata structures serves as a node pointing to a plurality of other metadata structures. The method may further include locating the plurality of missing metadata structures and a plurality of addresses associated with the missing metadata structures based on the determined plurality of current addresses corresponding to a plurality of valid metadata structures. The method may also include rebuilding the plurality of missing metadata structures based on the located plurality of addresses associated with the missing metadata structures, whereby the rebuilding comprises assigning the located plurality of address to the plurality of missing metadata structures and redirecting the plurality of missing metadata structures to point to a correct plurality of other metadata structures.

According to yet another embodiment, a computer program product for repairing a corrupted filesystem, whereby the corrupted filesystem includes a plurality of corrupted metadata structures is provided. The computer program product may include one or more computer-readable storage devices and program instructions stored on at least one of the one or me tangible storage devices, the program instructions executable by a processor. The computer program product may include program instructions to determine a plurality of missing metadata structures associated with the corrupted filesystem, whereby the missing metadata structures have been overwritten by a corruption. The computer program product may also include program instructions to determine a plurality of current addresses corresponding to a plurality of valid metadata structures in a hierarchical metadata structure of the corrupted filesystem based on the determined plurality of missing metadata structures, whereby at least one metadata structure within the plurality of metadata structures serves as a node pointing to a plurality of other metadata structures. The computer program product may further include program instructions to locate the plurality of missing metadata structures and a plurality of addresses associated with the missing metadata structures based on the determined plurality of current addresses corresponding to a plurality of valid metadata structures. The computer program product may also include program instructions to rebuild the plurality of missing metadata structures based on the located plurality of addresses associated with the missing metadata structures, whereby the rebuilding comprises assigning the located plurality of address to the plurality of missing metadata structures and redirecting the plurality of missing metadata structures to point to a correct plurality of other metadata structures.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
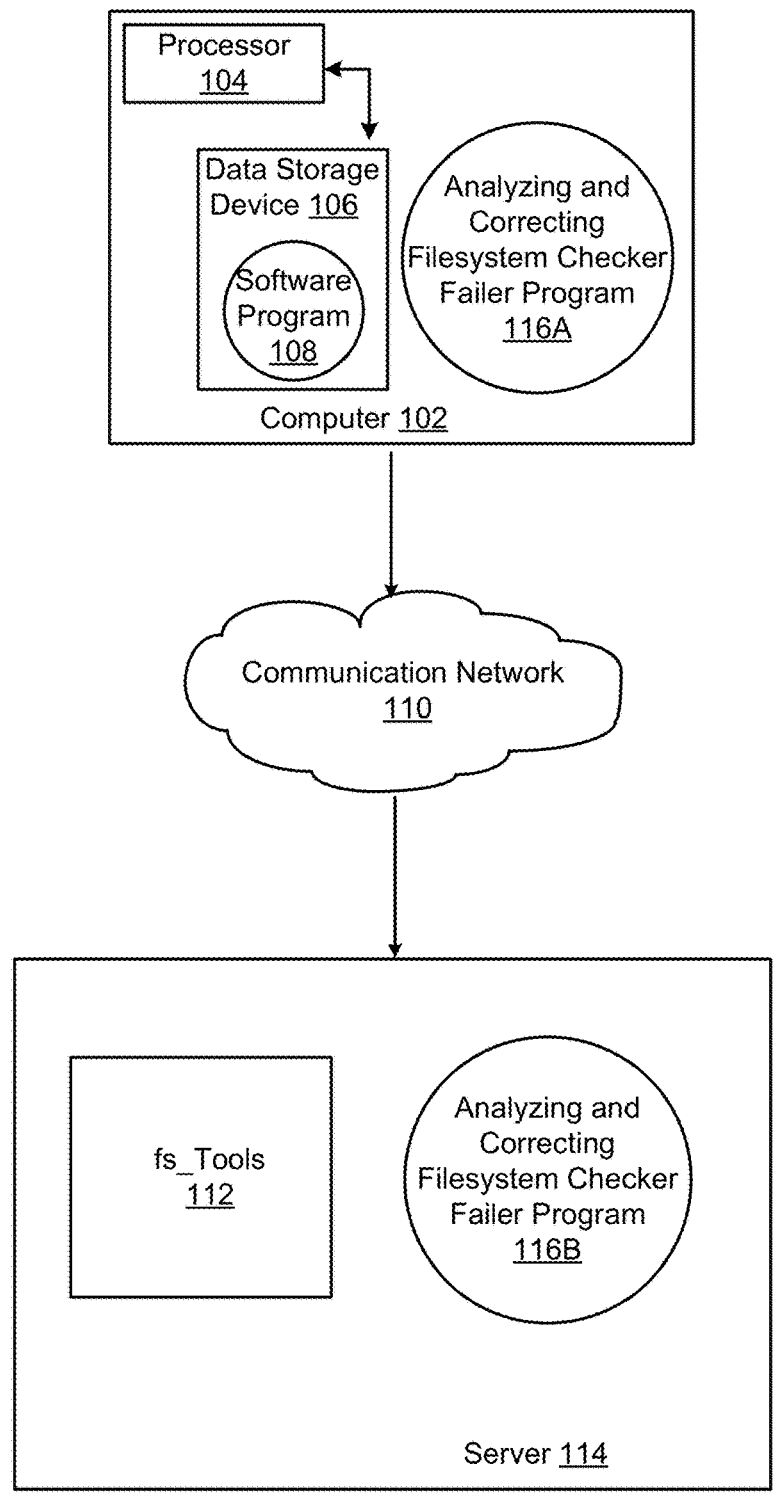
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to filesystem checker failure. The following described exemplary embodiments provide a system, method and program product to, among other things, analyze and correct a corruption which has caused a filesystem checker failure so that the filesystem checker will run without error. Therefore, the present embodiment has the capacity to improve the technical field of filesystem checker failure by analyzing and correcting a corruption which has led to filesystem checker failure. More specifically, fsck failures may be analyzed to determine why fsck is failing and to fix fsck if possible by analyzing the state of the metadata on the filesystem and determining if any changes to the metadata can be made so that the fsck tool can run successfully.

Furthermore, the present embodiment may be used for other executables in addition to fsck. As such, any executable which depends on obtaining addresses to on disk structures to cause the data on the structure to be accessed could have the same technique described herein if it is not able to be executed because of corruption. For example:
1) One example is fsdb. Fsdb is a "filesystem debugger". It may not work until certain address are remade. However, once fsdb is able to work again, it can be used to complete changing other addresses more easily to get fsck to work faster.
2) Another example could be storage pools. Storage pools of disks are used by pool managers to create virtual disks to be exported to clients in a virtual environment. These pools depend on a "pool_start" program to make the disk pools accessible to pool managers. Disk corruption could cause "pool_start" to not be able to work. Creating a pool_discover program to discover needed pool structure addresses to be replaced in corrupted pool structures by "pool update" executables could be done in a similar manner as described herein with respect to the present embodiment.

Therefore, as illustrated in the previous examples, fsck is not the only executable that can benefit from the technique described with respect to the present embodiment.

As previously described, most filesystems have a filesystem, such as fsck checker to ensure that the metadata of the filesystem is consistent. The filesystem checker is typically used after a system crash to ensure the filesystem is consistent before being mounted. The filesystem checker may also be used whenever a filesystem has been corrupted to attempt to fix any metadata inconsistencies and recover any lost files caused by corruption. However, if fsck is not able to complete, then the operating system will not allow the filesystem to be mounted and used. As such, the customer is required to restore the filesystem data from backup which may be in a consistent state so it can be used and mounted. However, restoring from backup is often a very expensive and time consuming process that should be avoided if possible. As such, it may be advantageous, among other things to provide tools and a method for dealing with fsck failures to analyze why fsck is failing and to fix fsck if possible. As such, the tools may be able to analyze the state of the metadata on the filesystem and determine if any changes to the metadata can be made so that the fsck tool can run successfully. Additionally, the process may be defined that will either explain to customer why fsck cannot be made to work because corruption is to severe or to make changes to metadata and allow fsck to work to completion so that the filesystem can be mounted and re-used.

According to at least one implementation, the present embodiment may provide tools and a process utilizing the tools to eliminate the problem of fsck failure due to corruption. As such, the combination of the tools working together with the provided technique may provide an explanation that may be given to the customer which explains the reason for the problem. Additionally, the technique may demonstrate how to overcome corruption problems by using, for example, tool such as a J2_discover tool to discover addresses which need to be used to correct corrupted metadata structures. Therefore, if the J2_discover tool is able to determine the addresses of the missing data, then other tools are available to update the corrupted structures with proper addresses. According to the present embodiment, such an implementation may be performed independent of fsck since it is not usable due to the fact that fsck is unable to find the missing addresses that fsck needs to access metadata.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to analyze and correct a corruption which has caused a filesystem checker failure so that the filesystem checker will run without error.

According to at least one implementation, the present embodiment may create three tools to resolve the problem of fsck failure due to corruption, such as the Tool fs_discover; the tool fs_formatter; and update tools (e.g., update_superblock). For example, the tool j2_discover may re-discover metadata objects and outputs their addresses. Additionally, the present embodiment may combine tools to further analyze fsck failure problem and ensure everything possible has been done to overcome fsck failures. The idea of rediscovering addresses of key metadata structures and re-building metadata objects to overcome fsck failure may assist when dealing with fsck failures in the future. As such, after the proper updates have been made from the update_tools, the fsck can be run. The filesystem can then be mounted and further analyzed to see if it can be used without having to do a total restore from backup.

Furthermore, an advantage of the present embodiment may be that the customer has been given complete analysis of the filesystem state and knows that everything has been done to possibly recover. As such, customer satisfaction may be improved. Also, the present embodiment may provide a method in some cases to actually fix the problem with fsck failing and therefore, allow fsck to complete so work on the filesystem can continue.

The present embodiment may create algorithms for each metadata type which take advantage of internal relationships in metadata structures so that each algorithm can announce if it has discovered a metadata page of the type mentioned. As such, a case statement is used to process each page of the volume and announce its metadata type and offset or announce it is a non-metadata page. The executable can run with threads to improve performance. The following is an example of what a typical output may look like:

| LV OFFSET | PAGE COUNT | METADATA TYPE | ADDITIONAL DATA |
|---|---|---|---|
| 0x0 | 0x8 | NONMETA | |
| 0x8 | 0x1 | SUPER | |
| 0x9 | 0x1 | IMAP_CTL | |
| 0xa | 0x1 | IAG | 0 |
| 0xb | 0x1 | AIT1 | |
| 0xc | 0x3 | NONMETA | |
| 0xf | 0x1 | SUPER | |
| 0x10 | 0x1 | BLK_H | |
| 0x11 | 0x2 | NONMETA | |
| 0x13 | 0x1 | BLK_CTL | |
| ... | | | |
| ... | | | |

The above LV OFFSET data provide addresses (sometimes called pointers) which is the information fsck needs to work. These pointers are normally kept in key metadata-structures. If these structures have been overwritten (not discovered by fs_discover), then they need to be re-made through using the fs_discover, formatter, and update_<meta-data> tools.

According to at least one implementation of the present embodiment, four steps may be implemented as follows: determine from fs_discover output if there are any metadata structures missing (e.g., over written by corruption); determine what type of structures the corrupted structure points to; using fs_discover output, determine if these structures and their addresses can be located; and if missing addresses can be determined, then remake the corrupted structure with addresses that it should be using so that it once again points to structures allowing fsck to run.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an Analyzing and Correcting Filesystem Checker Failure Program 116A. The networked computer environment 100 may also include a server 114 that is enabled to run an Analyzing and Correcting Filesystem Checker Failure Program 116B that interacts with a set of fs_Tools 112 and a communication network 110. The set of fs_Tools 112 may be used to determine addresses of the missing data (fs_discover), view discovered data (fs_formatter), and update corrupted structures with the proper addresses (Update Tools).

The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Analyzing and Correcting Filesystem Checker Failure Program 116B running on server computer 114 via the communications network 110. The communications network 110 may include connections, such as wire, wireless communication links, or fiber optic cables. As will be discussed with reference to FIG. 7, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a set of fs_Tools 112.

As previously described, the client computer 102, may access the set of fs_Tools 112 or the Analyzing and Correcting Filesystem Checker Failure Program 116B, running on server computer 114 via the communications network 110. For example, a user using a client computer 102 may be given a complete analysis of the filesystem state. As previously described, the Analyzing and Correcting Filesystem Checker Failure Program 116A, 116B may assist the user in re-discovering metadata objects and outputting their addresses. Furthermore, the Analyzing and Correcting Filesystem Checker Failure Program 116A, 116B may actually fix the discovered problem with fsck failing and allow fsck to complete so work on a filesystem may continue. The Analyzing and Correcting Filesystem Checker Failure method is explained in more detail below with respect to FIG. 3.

Figure 2:
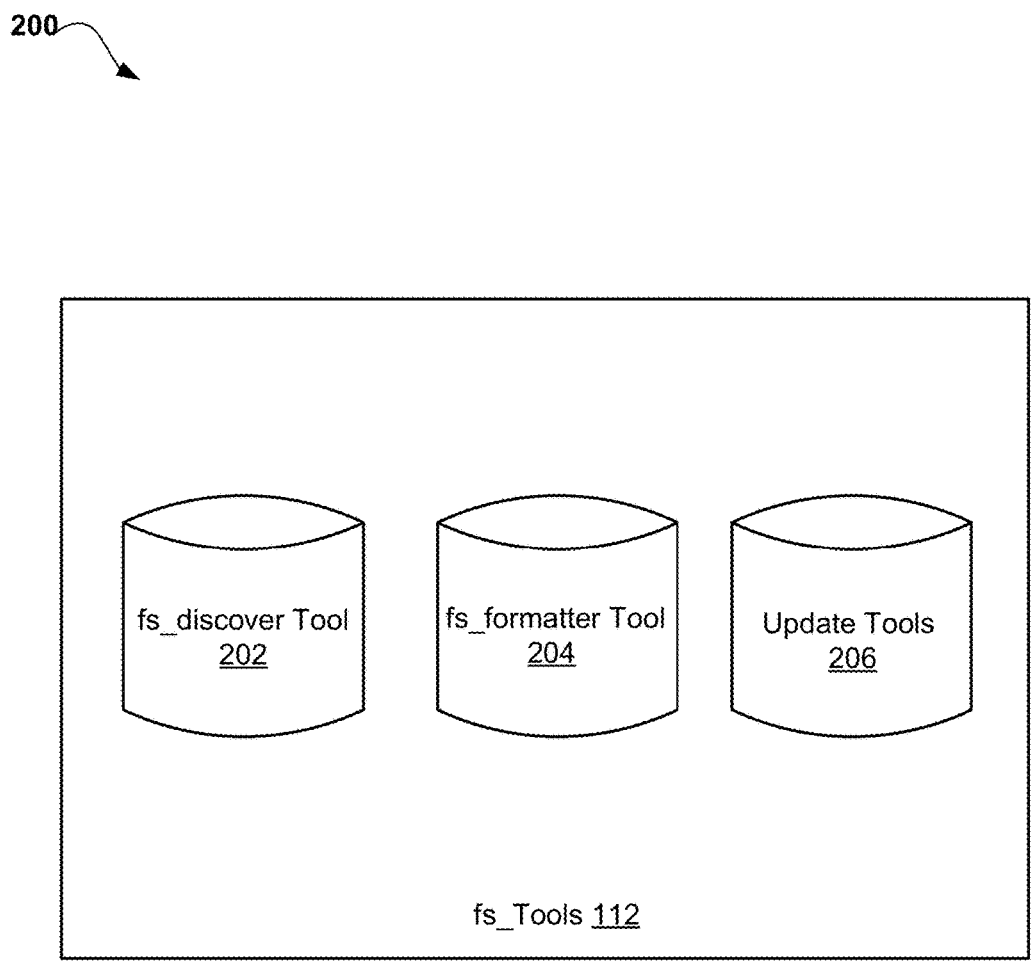
FIG. 2 is an exemplary illustration of tools included in the set of fs_Tools associated with the Analyzing and Correcting Filesystem Checker Failure Program according to at least one embodiment.

Referring now to FIG. 2, an exemplary illustration 200 of the tools included with the set of fs_Tools 112 and associated with the Analyzing and Correcting Filesystem Checker Failure Program 116A, 116B (FIG. 1) in accordance with one embodiment is depicted. The Analyzing and Correcting Filesystem Checker Failure Program 116A, 116B (FIG. 1) may interact with a set of created fs_Tools 112. According to at least one implementation, the present embodiment may create three tools to resolve the problem of fsck failure due to corruption as follows:

1) The creation of a tool called fs_discover 202 which is not dependent on fsck and has the ability to discover where metadata resides on the volume that the filesystem resides on. It is able to discover all metadata that still resides on the volume and outputs its page offset and type as it is discovered.

2) The creation of a tool called fs_formatter 204. Fs_formatter may be able to use a symbol file that contains the definitions of metadata objects and use it to output the contents of a metadata structure (such as a superblock) given as input:
   a) the type definition (example superblock)
   b) the volume name
   c) page offset on the volume where data resides (this page offset is obtained from output of fs_discover)

This output can be redirected to a file and used to analyze what changes may be needed in structure to help make meta-data consistent.

3) Creation of update tools 206 (e.g., update_superblock) which will take formatter output that has been changed to make metadata more available to fsck and update these changes given as input:
   a) the text file where changes have been made
   b) the volume needed to be updated
   c) the page offset where update needs to occur.

Figure 3:
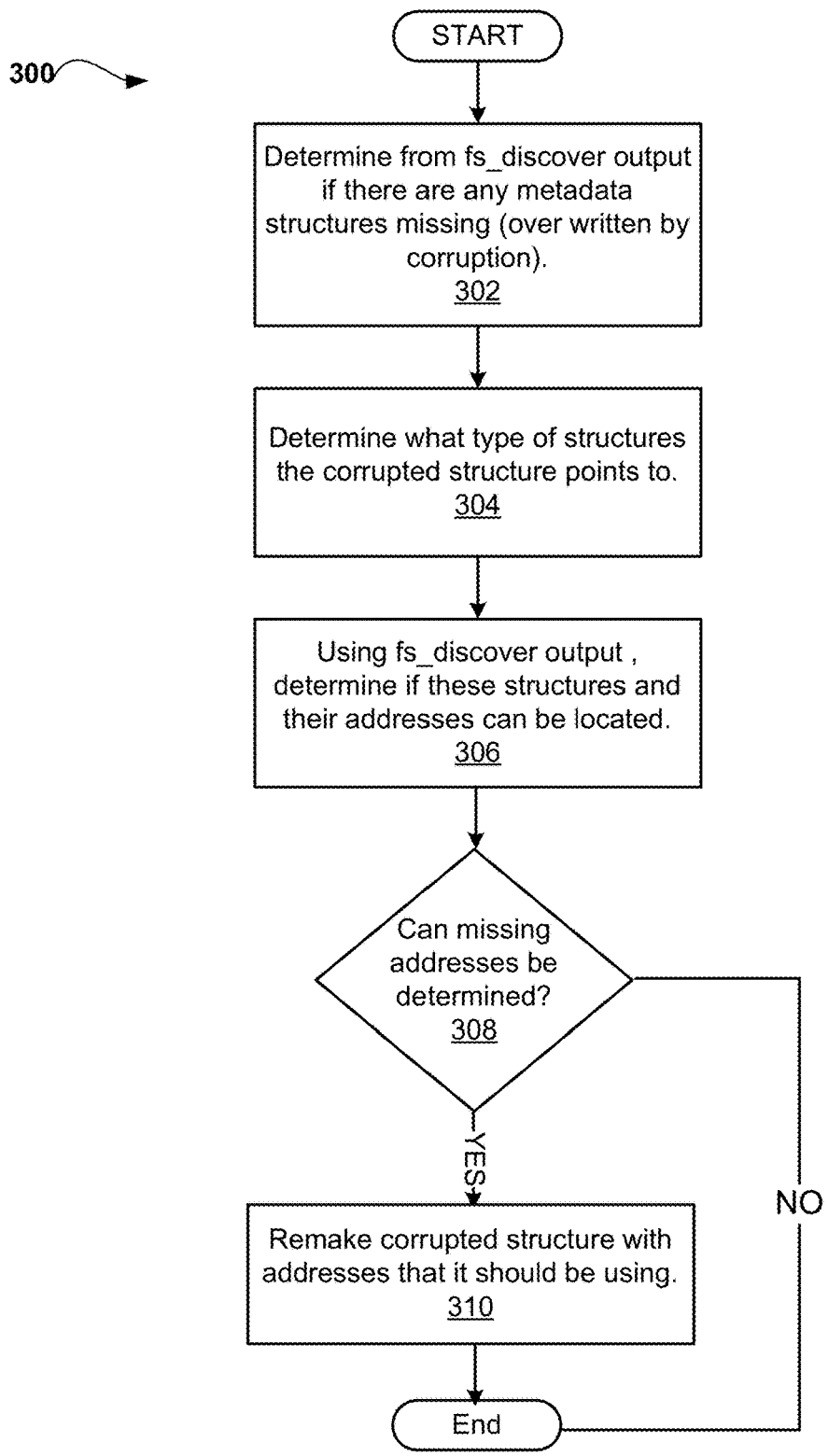
FIG. 3, is an operational flowchart illustrating the steps carried out by a program for analyzing and correcting corruption which has led to Filesystem Checker Failure according to at least one embodiment.

Referring now to FIG. 3, an operational flowchart 300 illustrating the steps carried out by a program for analyzing and correcting corruption which has led to Filesystem Checker Failure is depicted. As previously described, the present embodiment may provide the capability for a user to utilize the Analyzing and Correcting Filesystem Checker Failure Program 116A, 116B (FIG. 1) in conjunction with the set of fs_Tools 112 (FIG. 1) to re-discover metadata objects and outputting their addresses. Furthermore, the Analyzing and Correcting Filesystem Checker Failure Program 116A, 116B (FIG. 1) and the set of fs_Tools 112 (FIG. 1) may be utilized to actually fix the discovered problem with fsck failing and allow fsck to complete so work on a filesystem may continue. Each step of the method depicted in FIG. 3 is explained further with respect to FIGS. 6A-6D.

At 302, the method will determine by the output of the tool fs_discover 202 (FIG. 2), whether there are any metadata structures missing (i.e., over written by corruption). As previously described, fs_discover 202 (FIG. 2) is not dependent on fsck and has the ability to discover where metadata resides on the volume that the filesystem resides on. Therefore, fs_discover 202 (FIG. 2) is able to discover all metadata that still resides on the volume and outputs its page offset and type as it is discovered.

Next at 304, the type of structures that the corrupted structure points to is determined. Then at 306, using fs_discover output 202 (FIG. 2), the method will determine if these structures and their addresses can be located.

Next at 308, it is determined whether missing addresses can be determined. If at 308 it is determined that missing addresses cannot be determined then the method will end. However, if at 308 it is determined that missing addresses can be determined, then at 310 the method will remake the corrupted structure with addresses that it should be using. As such, the addresses will once again point to structures allowing fsck to run, thereby recovering groups of files.

According to at least one implementation, the method may remake the corrupted structure by obtaining additional data. As such, the additional data can be determined through computation of values currently in the block discovered. When there is no direct pointer to the previous block, the value in the data indicates which parent block must point to it. For example, with respect to a group of inodes, their inode numbers will be within a certain range. If the range is, for example, between 0 and 4095 then this page must have a pointer to it in IAG 0. However, if the group of inodes have a range 0 through 31, then the address of the first page of these inodes will be in the first extent of the JAG 0 structure that points to groups of inodes. If the group of inodes have a range from 32 to 63 then the address of the first page of these inodes will be in the next array element of the array of extents kept in the IAG 0. Therefore, by looking at the values of the inode numbers, the method may determine the IAG block (e.g., 0, 1, 2, 3 etc.) and the array element in the extent array that points to it. Each IAG has 128 element array of extents pointing to 32 groups of inodes for a total of 4096. Since the block has been "discovered" (i.e., has passed requirements to be the type of block the method is looking for) it should then have the data to determine what parent it belongs to. In the same manner, regarding an IAG structure that has an index field with value 0, 1, 2, etc., the method may look at this index field and determine which index of the inode of inode (IOI) extents will point to it.

According to the present embodiment, j2_discover's main function is to discover the addresses where these blocks reside. The method may use the contents of the child's blocks (as described above) to determine at what place in the parent block the discovered addresses should be placed. Furthermore, the design of J2 is such that algorithms exist which allow you to know where to put the discovered addresses in the parent block. One advantage of the present embodiment is that rather than fixing everything that is corrupt, the method puts the pointers in place that fsck needs in order to work. Then fsck run and fix what needs to be fixed.

If the groups of inodes are at the bottom of the hierarchy, the present embodiment may remake all of the parent objects and therefore, enable fsck to work. However, if some of the groups of inodes are corrupt or lost, then fsck will not be able to fix everything and some null pointers may be in some of the IAG arrays and fsck will work with what is given to it. The present embodiment allows the environment is in such a state so that fsck can run properly.

Additionally, the present embodiment may not only be implemented with respect to J2, but the same strategy may be employed to other filesystems and their fsck's since similar relationships may exist in other designs. Every fsck depends on a design of pointers. As such, if the design can be recreated, then fsck may work in every type of filesystem. Additionally, the fs_discover Tool 202 (FIG. 2) (e.g., j2_discover) may allow the method to evaluate in great detail whether there is enough pointers to pursue fixing filesystem. As such, the present embodiment allows for a complete analysis that may be given to a corrupt filesystem.

Additionally, as previously described, the present embodiment may be used for other executables in addition to fsck. Therefore, any executable which depends on obtaining addresses to on disk structures to cause the data on the structure to be accessed could have the same technique described herein if it is not able to be executed because of corruption.

It may be appreciated that FIG. 3 provides only an illustration of one implementation and does not imply any limitations with regard to how different embodiments may be implemented. Many modifications to the depicted environments may be made based on design and implementation requirements. For example, fs_discover may be used to create both a sparse and a non-sparse metacapture file that may be used in problem diagnosis. A metacapture file is all the metadata of a filesystem put into one file. As such, the present embodiment may alleviate fsck having to work in order to create a metacapture file. Therefore, both a sparse and non-sparse metacapture file may be created without the use of fsck.

Figure 4:
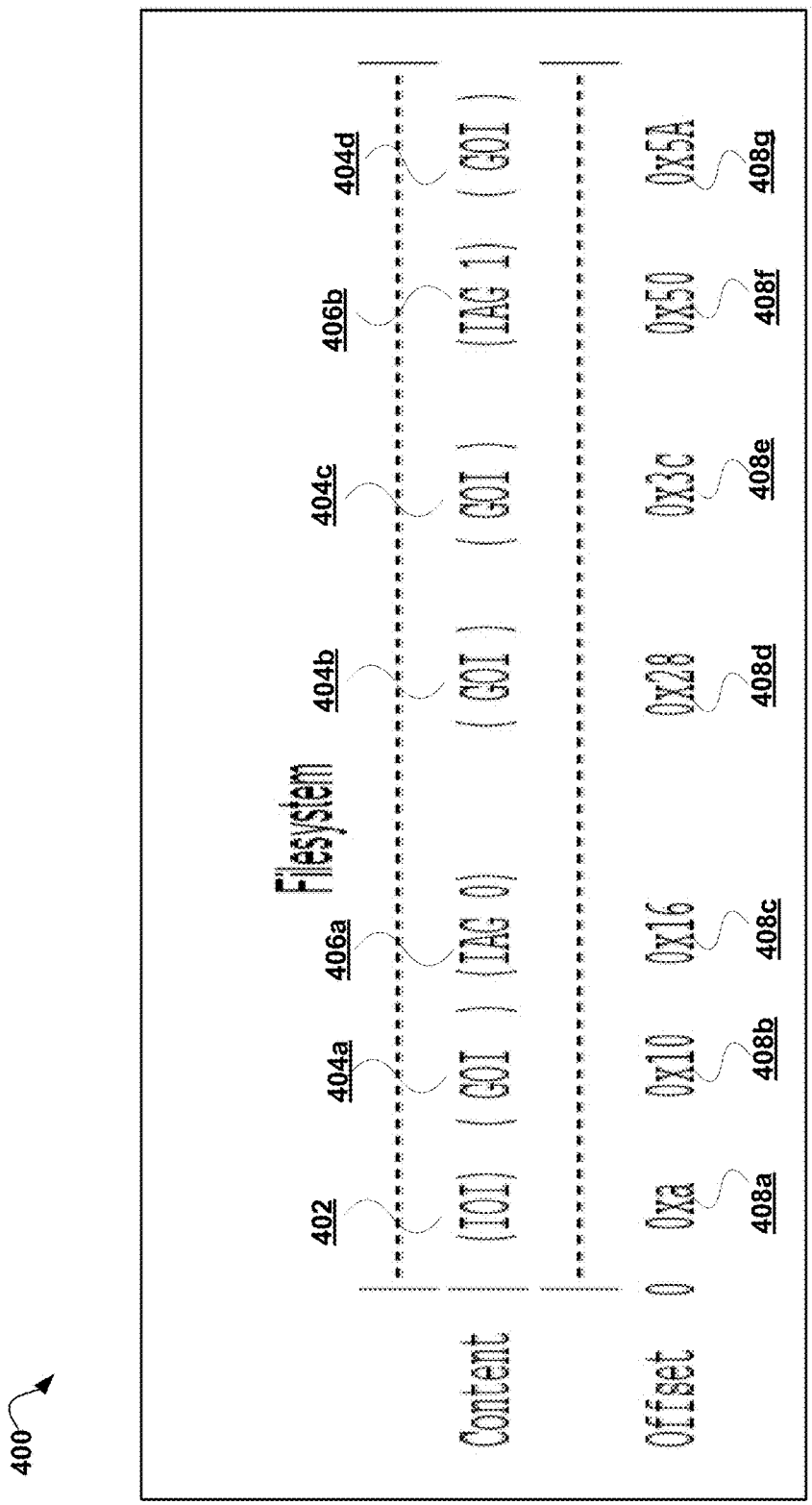
FIG. 4, is an exemplary illustration of metadata setup on disk with addresses according to at least one embodiment.

Referring now to FIG. 4, an exemplary illustration of metadata set up on disk with addresses 400 in accordance with one embodiment is depicted. An inode is a data structure used to represent a filesystem object, which can be a file or a directory. Each inode stores the attributes and disk block location(s) of the filesystem object's data. An Inode of Inodes (IOI) 402 contains the addresses of Inode Allocation Groups (IAG) 406a, 406b. An IAG 406a, 406b contains the addresses 408a-408g of Groups of Inodes (GOI) 404a-404d. A Group of Inodes GOI 404a-404d contains metadata structures which describe files.

Figure 5:
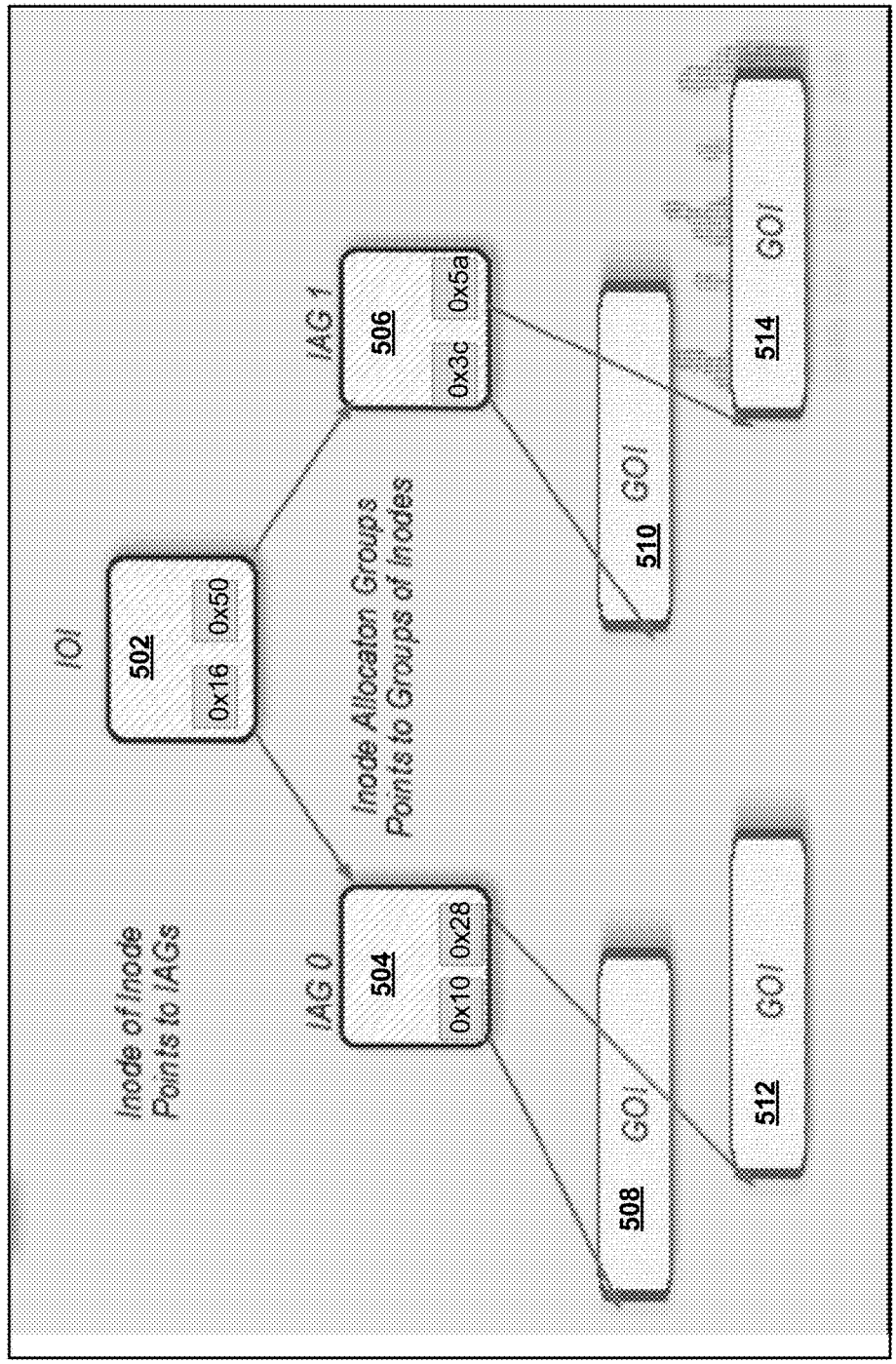
FIG. 5 is an exemplary illustration of how structures point to each other according to at least one embodiment.

Referring now to FIG. 5, an exemplary illustration of how structures point to each other 500 in accordance with one embodiment is depicted. As such, the mode of modes (IOI) 502 points to mode Allocation Groups (IAGS) 504,506. The mode Allocation Groups (IAGS) 504,506 point to the Groups of modes (GOI) 508-514.

Figure 6A:
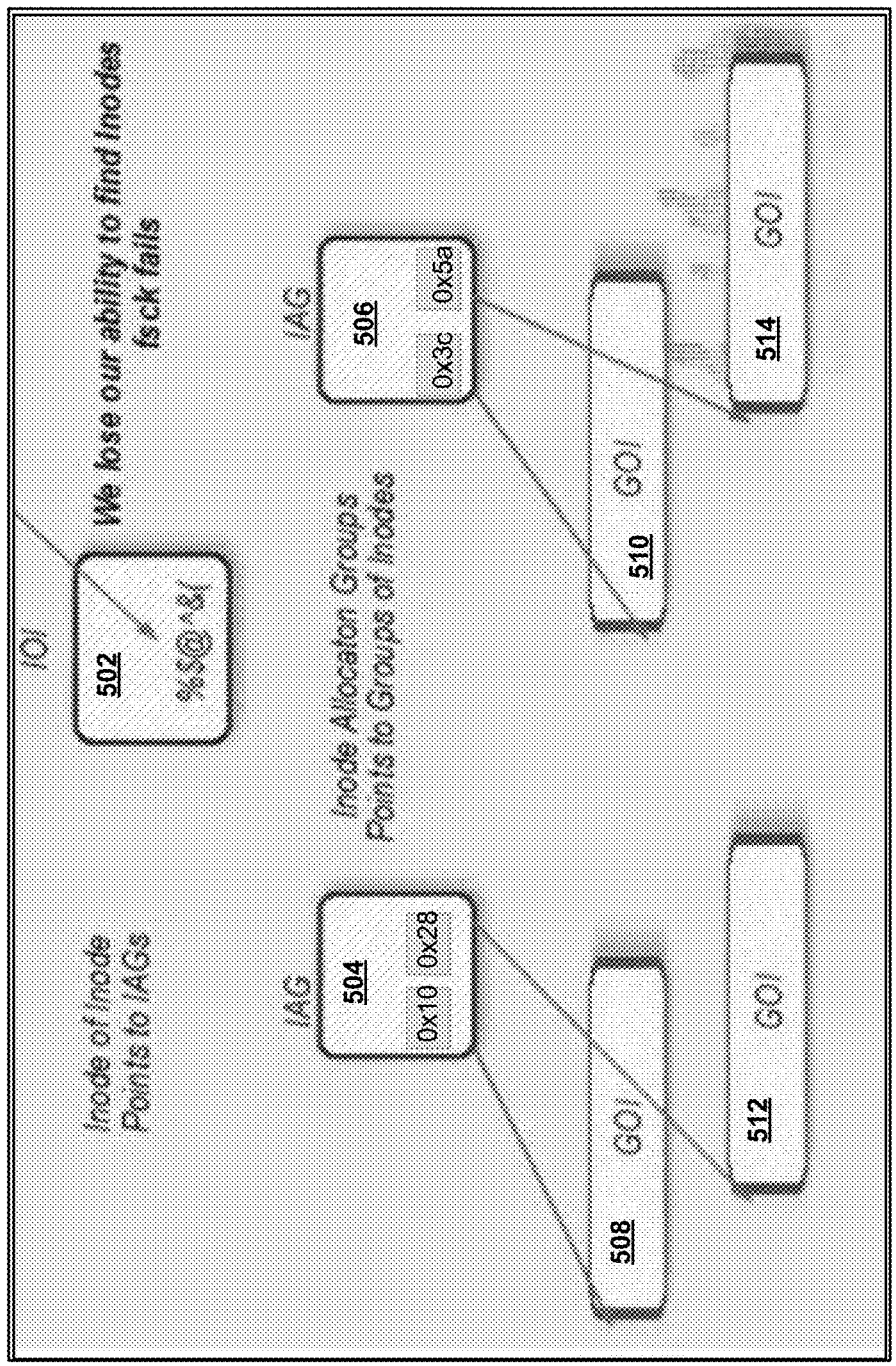
FIG. 6A-6D are exemplary illustrations of applying the method steps described in FIG. 3 according to at least one embodiment.
Figure 6B:
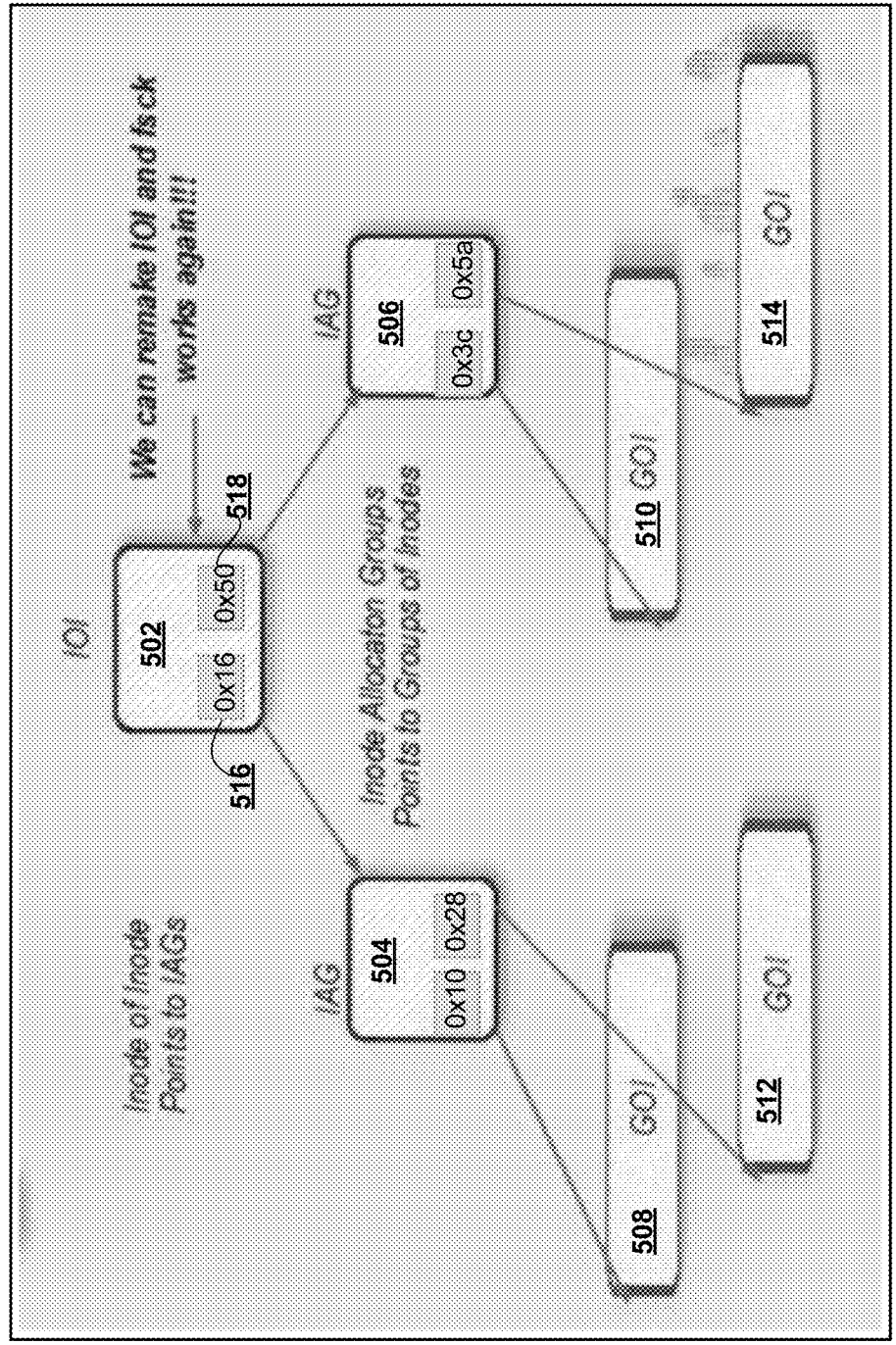

Referring now to FIGS. 6A-6D, examples of applying the method steps described in FIG. 3 in accordance with one embodiment are depicted. For example purposes only, FIGS. 6A-6D may depict J2 filesystem, however the present embodiment may be applied to other filesystems and their fsck's. In FIG. 6A, the mode of modes IOI 502 gets overwritten. As such, the ability to find modes is lost and therefore, a filesystem checker, such as a "file system consistency check" fsck fails. As previously described with respect to FIG. 3 at 302, it is determined from an fs_discover output tool 202 (FIG. 2) (e.g., j2_discover) if there are any metadata structures missing or overwritten by corruption. Regarding FIG. 6A, it may be discovered from the fs_discover output 202 (FIG. 2) that the IOI structure 502 is missing. Therefore, at step 304 (FIG. 3) the method will determine what type of structures the corrupted structure points to. Regarding FIG. 6A, the IOI structure 502 points to IAG structures 504 and 506.

Next, at step 306 (FIG. 3), using fs_discover output 202 (FIG. 2), the method will determine if these structures and their addresses can be located. Therefore, regarding FIG. 6A, the method will look for IAG structures 504 and 506 in fs_discover output 202 (FIG. 2). For example:

| ->j2_discover /dev/fslv01 | | | |
|---|---|---|---|
| LV OFFSET | PAGE COUNT | METADATA TYPE | ADDITIONAL DATA |
| 0x0 | 0x8 | NONMETA | |
| 0x8 | 0x1 | SUPER | |
| ... | | | |
| 0x14 | 0xf | BLK_DMAP | |
| 0x16 | 0x1 | IAG | 0 |
| 0x23 | 0x1 | NONMETA | |
| 0x24 | 0x1 | BLK_DMAP | |
| ... | ... | ... | ... |
| 0x50 | 0x1 | IAG | 1 |

Next, at step 308 (FIG. 3), the method will check whether any missing addresses can be determined and if so, then at step 310 (FIG. 3) the method will remake the corrupted IOI structure 502 (FIG. 6B) with addresses that it should be using so that once again IOI structure 502 (FIG. 6B) points to structures 504, 506 allowing fsck to run. Regarding FIG. 6B, addresses (0x16) 516 and (0x50) 518 will be put into their appropriate places in a replica of corrupted IOI structure 502 allowing fsck to work.

Figure 6C:
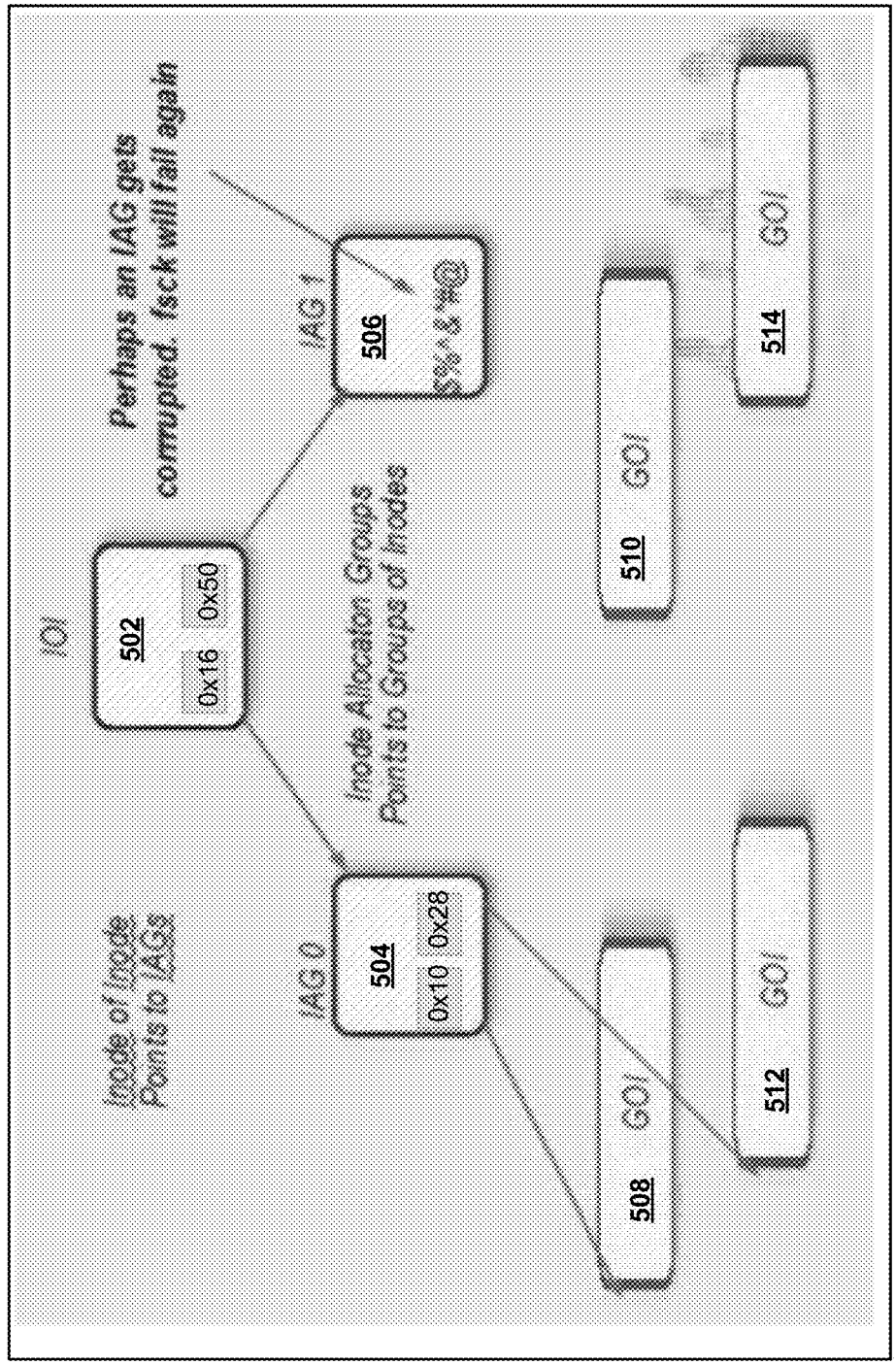
Figure 6D:
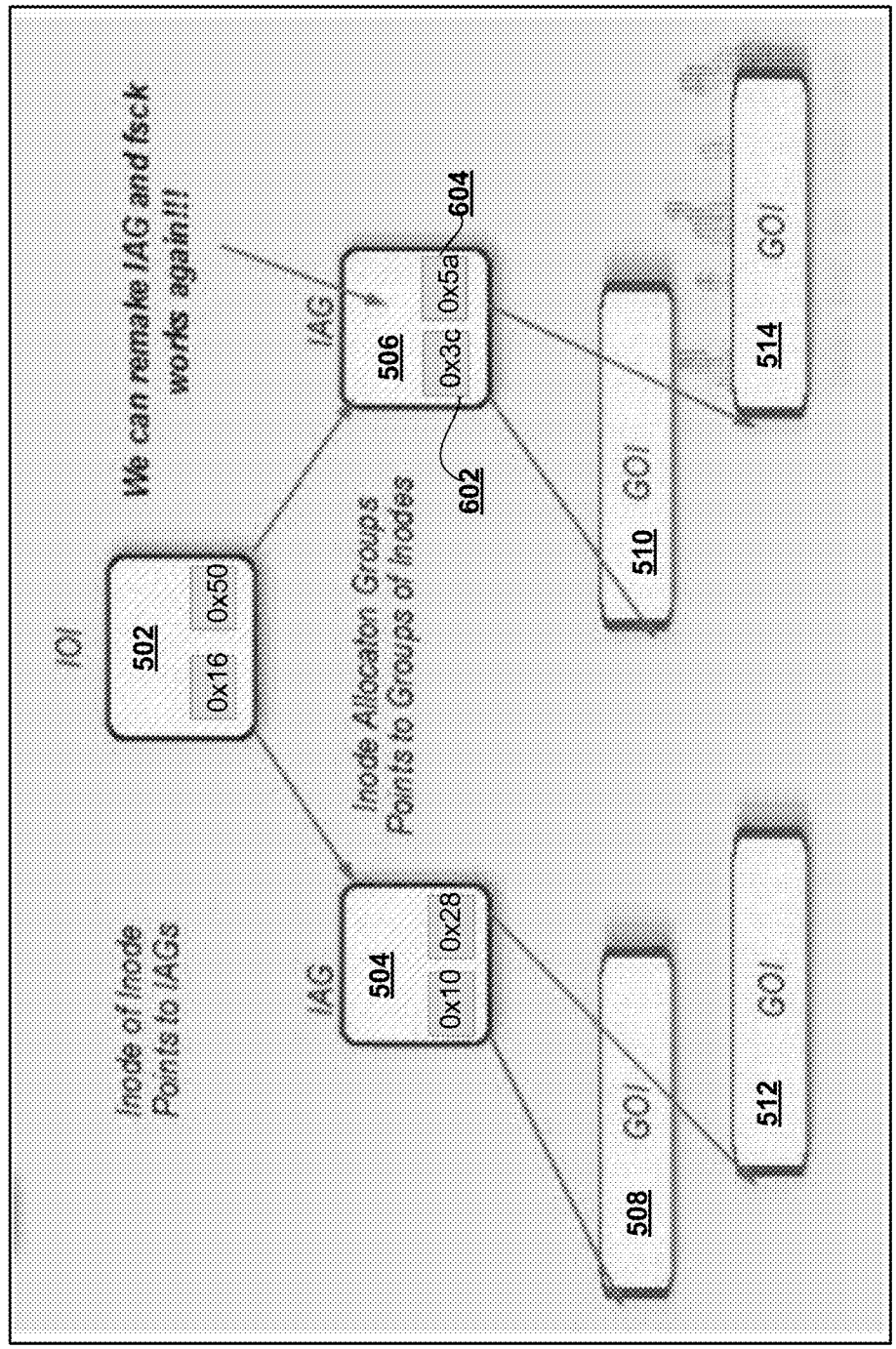

Regarding FIG. 6C, it may be discovered from the fs_discover output 202 (FIG. 2) that an IAG 506 is corrupted. For example, at 302 (FIG. 1) the method may determine from an fs_discover output tool 202 (FIG. 2), such as J2_discover output, if there are any metadata structures 504, 506 missing or overwritten by corruption. With respect to FIG. 6C, it can be determined from the j2_discover output that the IAG structure IAG1 506 is missing, Next at step 304 (FIG. 3), the method will determine what type of structures the corrupted structure 506 points to. Therefore, regarding FIG. 6C, the corrupted IAG structure IAG 1 506 points to GOI structures 510 and 514. Then at step 306 (FIG. 3) using j2_discover output, the method will determine if these structures and their addresses can be located. Therefore, regarding FIG. 6C, the method will look for GOI structures 510 and 514 in j2_discover output.

Next, at step 308 (FIG. 3), the method will check whether any missing addresses can be determined and if so, then at step 310 (FIG. 3) the method will remake the corrupted IAG structure 506 (FIG. 6D) with addresses that it should be using so that once again it points to structures 510, 514 allowing fsck to run. Regarding FIG. 6D, addresses (0x3c) 602 and (0x5a) 604 will be put into their appropriate places in a replica of corrupted IAG structure 506 allowing fsck to work.

Figure 7:
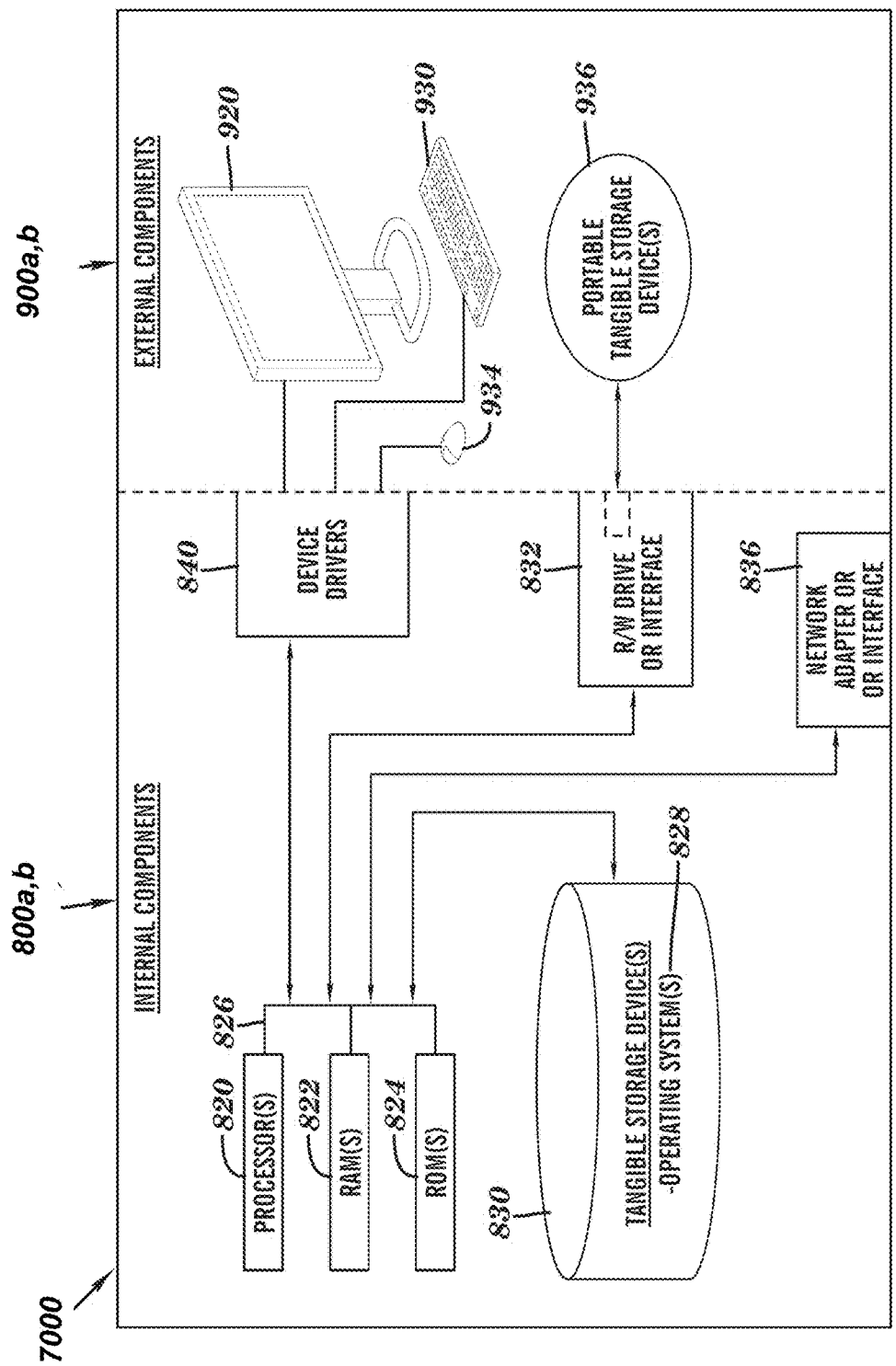
FIG. 7 is a block diagram of internal and external components of computers and servers depicted in FIG. 1 according to at least one embodiment.

FIG. 7 is a block diagram 7000 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 7. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Analyzing and Correcting Filesystem Checker Failure Program 116A in client computer 102 (FIG. 1) and the Analyzing and Correcting Filesystem Checker Failure Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Analyzing and Correcting Filesystem Checker Failure Program 116A, 116B (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Analyzing and Correcting Filesystem Checker Failure Program 116A (FIG. 1) in client computer 102 (FIG. 1) and the Analyzing and Correcting Filesystem Checker Failure Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Analyzing and Correcting Filesystem Checker Failure Program 116A (FIG. 1) in client computer 102 (FIG. 1) and the Analyzing and Correcting Filesystem Checker Failure Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
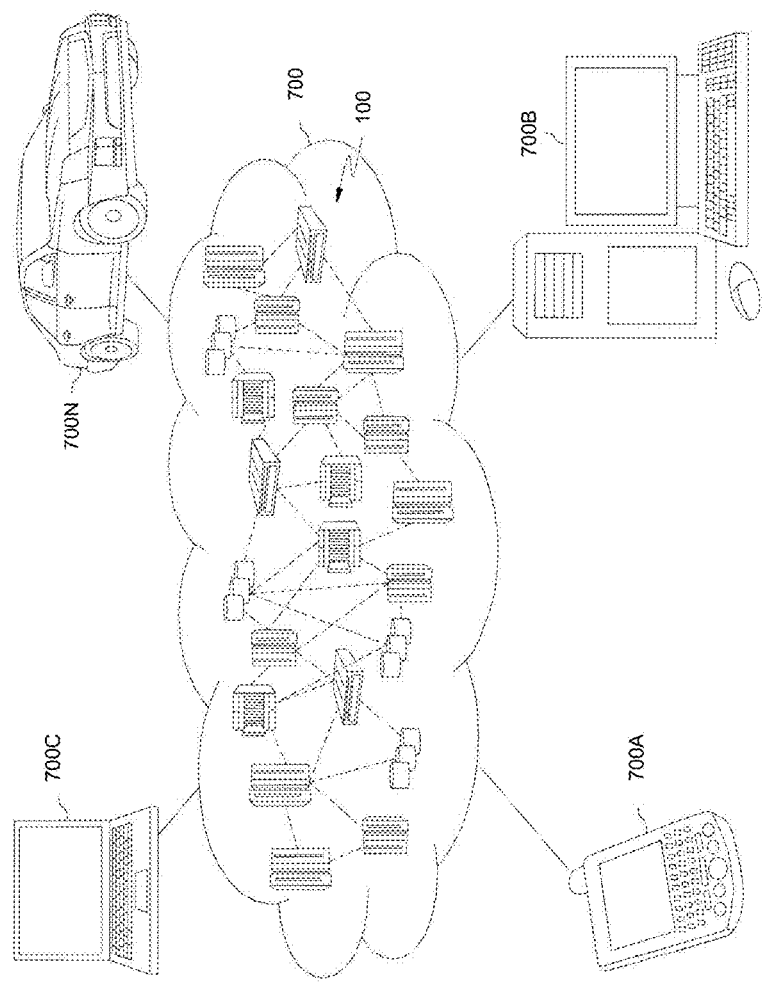
FIG. 8 is a block diagram of an illustrative cloud computing environment including the computer system depicted in FIG. 1, in accordance with an embodiment of the present disclosure.

Referring now to FIG. 8, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 8 are intended to be illustrative only and that computing nodes 100 and cloud computing environment 700 can communicate with any type of computerized device over any type of network and/or network addressable connection (e.g., using a web browser).

Figure 9:
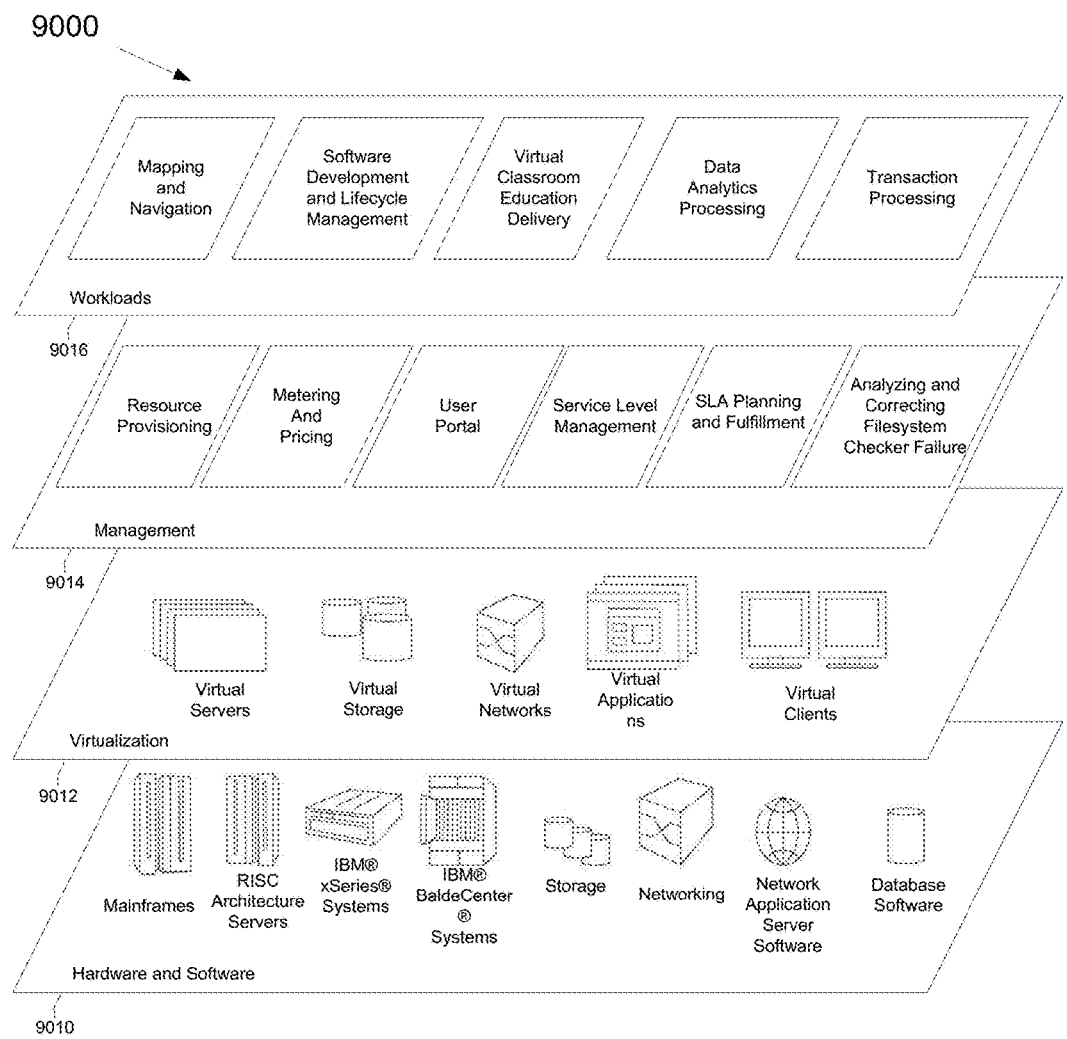
FIG. 9 is a block diagram of functional layers of the illustrative cloud computing environment of FIG. 8, in accordance with an embodiment of the present disclosure.

Referring now to FIG. 9, a set of functional abstraction layers 9000 provided by cloud computing environment 700 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 9010 includes hardware and software components. Examples of hardware components include: mainframes; RISC (Reduced Instruction Set Computer) architecture based servers; storage devices; networks and networking components. In some embodiments, software components include network application server software.

Virtualization layer 9012 provides an abstraction layer from which the following examples of virtual entities may be provided: virtual servers; virtual storage; virtual networks, including virtual private networks; virtual applications and operating systems; and virtual clients.

In one example, management layer 9014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Analyzing and Correcting Filesystem Checker Failure Program may provide a process and a set of tools for analyzing and correcting corruption which has led to filesystem checker failure so that the checker will run without error.

Workloads layer 9016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for repairing a corrupted filesystem, wherein the corrupted filesystem comprises a plurality of corrupted metadata structures, the method comprising:

determining, by a processor, a plurality of missing metadata structures associated with the corrupted filesystem, wherein the missing metadata structures have been overwritten by a corruption;

determining a plurality of current addresses corresponding to a plurality of valid metadata structures in a hierarchical metadata structure of the corrupted filesystem based on the determined plurality of missing metadata structures, wherein at least one metadata structure within the plurality of metadata structures serves as a node pointing to a plurality of other metadata structures;

locating the plurality of missing metadata structures and a plurality of addresses associated with the missing metadata structures based on the determined plurality of current addresses corresponding to a plurality of valid metadata structures;

determining whether the located plurality of missing metadata structures can be rebuilt based on locating the plurality of addresses associated with the missing metadata structures, wherein determining whether the located plurality of missing metadata structures can be rebuilt comprises obtaining a plurality of additional data through computation of a plurality of values in the located plurality of addresses;

rebuilding the plurality of missing metadata structures based on the determining the located plurality of missing metadata structures can be rebuilt, wherein the rebuilding comprises assigning the located plurality of address to the plurality of missing metadata structures and redirecting the plurality of missing metadata structures to point to a correct plurality of other metadata structures;

in response to determining the located plurality of missing metadata structures cannot be rebuilt, generating an analysis of the corrupted filesystem and an explanation as to why the corrupted filesystem cannot be fixed, wherein generating an analysis includes determining where a plurality of changes have been made, a volume needed to be updated, and a page offset where an update needs to occur; and displaying the generated analysis and the explanation as to why the corrupted filesystem cannot be fixed along with a plurality of recommended changes to the located plurality of missing metadata structures.

2. The method of claim 1, wherein the plurality of missing metadata structures comprises of a group of inodes.

3. The method of claim 1, wherein at least one entry associated with the corrupted metadata structure is within a range associated with the determined plurality of valid metadata structures.

4. The method of claim 1, wherein the corrupted filesystem comprises a plurality of inodes and a plurality of ranges that are still valid and can be discovered.

5. The method of claim 1, wherein a file system consistency check (fsck) fails before rebuilding the plurality of missing metadata structures.

6. The method of claim 5, wherein the fsck runs after rebuilding the plurality of missing metadata structures.

7. The method of claim 1, further comprising:
providing a first utility to determine the plurality of current addresses corresponding to the plurality of valid metadata structures in the hierarchical metadata structure of the corrupted filesystem; and
providing at least one second utility to rebuild the plurality of missing metadata structures based on the located plurality of addresses associated with the missing metadata structures,
wherein the first utility and the at least one second utility comprise of at least one of a tool, a command, and a program.

* * * * *